United States Patent
Finn et al.

(10) Patent No.: US 11,598,722 B2
(45) Date of Patent: Mar. 7, 2023

(54) MULTI-POINT DETECTION SYSTEM

(71) Applicant: CARRIER CORPORATION, Palm Beach Gardens, FL (US)

(72) Inventors: Alan Matthew Finn, Hebron, CT (US); Michael J. Birnkrant, Wethersfield, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 85 days.

(21) Appl. No.: 17/052,949

(22) PCT Filed: May 8, 2019

(86) PCT No.: PCT/US2019/031234
§ 371 (c)(1),
(2) Date: Nov. 4, 2020

(87) PCT Pub. No.: WO2019/217504
PCT Pub. Date: Nov. 14, 2019

(65) Prior Publication Data
US 2021/0156800 A1 May 27, 2021

Related U.S. Application Data

(60) Provisional application No. 62/670,143, filed on May 11, 2018.

(51) Int. Cl.
*G01N 21/53* (2006.01)
*G01N 21/47* (2006.01)
*G08B 17/107* (2006.01)

(52) U.S. Cl.
CPC ..... *G01N 21/53* (2013.01); *G01N 2021/4792* (2013.01); *G01N 2201/0696* (2013.01); *G08B 17/107* (2013.01)

(58) Field of Classification Search
CPC ............. G01N 27/121; G01N 33/0031; G01N 33/004; G01N 21/53; G01N 1/2273;
(Continued)

(56) References Cited

U.S. PATENT DOCUMENTS 5,008,559 A * 4/1991 Beyersdorf .......... G08B 17/107
340/630
8,040,608 B2 * 10/2011 Evans ................ G01N 21/6458
359/590

(Continued)

FOREIGN PATENT DOCUMENTS

CN 206208752 U * 5/2017
EP 3220124 A1 * 9/2017 ................ G01J 1/42
(Continued)

OTHER PUBLICATIONS

International Search Report and Written Opinion for International Application No. PCT/US2019/031234 completed Aug. 14, 2019.
(Continued)

*Primary Examiner* — Michael P Stafira
(74) *Attorney, Agent, or Firm* — Carlson, Gaskey & Olds, P.C.

(57) ABSTRACT

A multi-point detection system includes one or more light sources, one or more light sensors, and a controller. The light sources are configured to emit an array of collimated light beams, and the light sensors define an array of lines of view. Each of the lines of view intersect different ones of the collimated light beams at respective detection nodes. The light sensors are operable to emit sensor signals responsive to received scattered light from interaction of the collimated light beams with an analyte at the detection nodes. The controller is connected to receive the sensor signals and configured to determine from the scattered light whether the analyte contains a contaminant.

25 Claims, 3 Drawing Sheets

(58) Field of Classification Search
CPC ........... G01N 15/06; G01N 2015/0046; G01N 2015/0693; G01N 15/0656; G01N 21/532; G01N 1/26; G01N 2015/1486; G01N 2291/02836; G01N 1/2205; G01N 2291/0217; G01N 2291/02408; G01N 29/024; G01N 15/02; G01N 15/0272; G01N 15/0606; G01N 15/10; G01N 2001/002; G01N 2015/105; G01N 15/0255; G01N 2015/0088; G01N 30/7206; G01N 1/2208; G01N 15/0637; G01N 2001/022; G01N 2015/0026; G01N 27/624; G01N 33/60; G01N 35/00009; G01N 2021/1793; G01N 2021/3513; G01N 2021/4792; G01N 21/39; G01N 22/00; G01N 2201/0696; G01N 2291/0258; G01N 2291/044; G01N 25/18; G01N 29/14; G01N 29/4436; G01N 33/57415; G01N 33/6848; G01N 1/22; G01N 15/0612; G01N 15/1459; G01N 2001/021; G01N 2015/0053; G01N 2015/0261; G01N 21/3504; G01N 21/6486; G01N 21/65; G01N 21/8901; G01N 2201/0221; G01N 2201/06113; G01N 2291/02845; G01N 2291/02881; G01N 30/72; G01N 33/0004; G01N 33/0036; G01N 33/0057; G01N 33/0075; G01N 35/00871; G01N 21/6428; G01N 15/1434; G01N 2015/1006; G01N 21/9501; G01N 21/6458; G01N 2015/149; G01N 21/8806; G01N 2015/0065; G01N 21/6452; G01N 21/645; G01N 21/47; G01N 15/147; G01N 2021/6439; G01N 21/64; G01N 15/1404; G01N 15/0205; G01N 15/1475; G01N 33/54373; G01N 21/05; G01N 21/253; G01N 2015/1493; G01N 15/1436; G01N 15/1484; G01N 21/6456; G01N 15/0211; G01N 2201/062; G01N 21/51; G01N 2021/6424; G01N 2015/1497; G01N 21/94; G01N 15/1463; G01N 21/76; G01N 21/49; G01N 15/1429; G01N 21/31; G01N 21/648; G01N 33/54313; G01N 21/55; G01N 21/85; G01N 15/14; G01N 2021/6419; G01N 33/5005; G01N 2021/6482; G01N 21/956; G01N 21/4788; G01N 15/0227; G01N 21/4738; G01N 15/1468; G01N 33/54366; G01N 21/658; G01N 21/474; G01N 2021/6441; G01N 21/59; G01N 21/0303; G01N 21/21; G01N 2201/0612; G01N 2201/08; G01N 2201/061; G01N 21/88; G01N 2035/00356; G01N 35/0099; G01N 21/6408; G01N 21/95; G01N 21/63; G01N 21/255; G01N 33/48; G01N 2021/4707; G01N 2201/12; G01N 21/4795; G01N 2015/1415; G01N 21/554; G01N 21/46; G01N 35/025; G01N 21/01; G01N 2015/1452; G01N 2021/4711; G01N 2201/0633; G01N 2021/0346; G01N 15/1456; G01N 21/03; G01N 2015/1406; G01N 35/0092; G01N 27/44721; G01N 2035/0441; G01N 2035/0443; G01N 2035/0444; G01N 2015/144; G01N 2021/6484; G01N 21/552; G01N 21/6454; G01N 21/7743; G01N 21/553; G01N 21/359; G01N 21/95323; G01N 2201/068; G01N 2021/359; G01N 21/95623; G01N 2021/4709; G01N 21/0332; G01N 35/0098; G01N 21/17; G01N 21/7703; G01N 2021/95676; G01N 21/6445; G01N 15/042; G01N 2035/00158; G01N 21/33; G01N 2021/6432; G01N 2015/008; G01N 2201/0621; G01N 2201/0627; G01N 2021/8848; G01N 21/35; G01N 2201/0697; G01N 1/28; G01N 2015/0073; G01N 30/74; G01N 2201/0415; G01N 35/04; G01N 21/274; G01N 2021/399; G01N 2021/479; G01N 2021/6463; G01N 2035/103; G01N 33/5302; G01N 15/05; G01N 21/3563; G01N 33/543; G01N 35/1002; G01N 35/1065; G01N 21/00; G01N 2035/00524; G01N 21/25; G01N 21/958; G01N 2035/0455; G01N 35/026; G01N 2015/1477; G01N 15/1425; G01N 2021/8864; G01N 21/8851; G01N 35/00693; G01N 35/028; G01N 2021/6478; G01N 21/24; G01N 33/49; G01N 2015/0038; G01N 2015/1438; G01N 2021/8825; G01N 21/95607; G01N 33/57434; G01N 2021/6471; G01N 21/538; G01N 2201/105; G01N 15/1012; G01N 2015/0294; G01N 2035/00346; G01N 2015/1081; G01N 33/542; G01N 2015/03; G01N 21/77; G01N 35/1004; G01N 2015/0238; G01N 2015/1075; G01N 2015/1087; G01N 2021/6417; G01N 2201/0833; G01N 2015/1454; G01N 2021/513; G01N 2021/8822; G01N 21/211; G01N 21/8507; G01N 2015/1472; G01N 2035/0097; G01N 2035/0491; G01N 21/031; G01N 33/53; G01N 1/40; G01N 2021/8809; G01N 2035/0405; G01N 2021/058; G01N 21/15; G01N 33/18; G01N 2201/0636; G01N 15/00; G01N 2015/0084; G01N 21/8422; G01N 33/582; G01N 2035/1076; G01N 21/75; G01N 1/405; G01N 21/41; G01N 21/6402; G01N 35/00; G01N 2021/7786; G01N 1/4077; G01N 2015/1018; G01N 2021/556; G01N 2021/8896; G01N 2035/1025; G01N 33/48728; G01N 2001/007; G01N 2015/1093; G01N 2035/0446; G01N 2035/1086; G01N 21/9505; G01N 2015/1488; G01N 2021/4735; G01N 27/44782; G01N 35/08; G01N 1/20; G01N 2021/8845; G01N 33/6803; G01N 35/00069; G01N 21/9506; G01N 33/574; G01N 35/00029; G01N 2021/8877; G01N 2035/0014; G01N 2035/00237; G01N 1/38; G01N 21/3577; G01N 33/52; G01N 2015/025; G01N 2015/0288; G01N 2001/2223; G01N 2201/02; G01N 2201/024; G01N 33/569; G01N 35/00732; G01N 15/1427; G01N 2015/1409; G01N 33/56966; G01N 2015/1411; G01N 2035/00725; G01N 21/08; G01N 15/1056; G01N 2015/047;
G01N 2201/0826; G01N 27/44791; G01N
21/276; G01N 33/585; G01N 2015/1447;
G01N 2021/052; G01N 2021/8427; G01N
21/3151; G01N 2201/0635; G01N
2201/0646; G01N 2201/065; G01N
2201/0846; G01N 2333/96433; G01N
2015/1402; G01N 2015/1481; G01N
21/896; G01N 33/4833; G01N 33/54386;
G01N 35/10; G01N 2015/0069; G01N
2021/0325; G01N 2021/151; G01N
33/54306; G01N 33/54326; G01N
2021/3596; G01N 33/56983; G01N
2021/4716; G01N 2021/4726; G01N
21/95692; G01N 30/02; G01N 33/483;
G01N 2015/1445; G01N 2201/064; G01N
33/487; G01N 2015/0216; G01N 21/314;
G01N 30/0005; G01N 33/497; G01N
2015/0092; G01N 2015/145; G01N
2021/7779; G01N 21/8483; G01N
2201/1222; G01N 33/54393; G01N
15/0266; G01N 15/12; G01N 2015/0222;
G01N 2021/458; G01N 21/23; G01N
33/50; G01N 2015/0011; G01N
2015/1037; G01N 2015/1443; G01N
21/453; G01N 21/9508; G01N
2333/96455; G01N 33/15; G01N 21/57;
G01N 33/56972; G01N 2021/0112; G01N
2035/00287; G01N 2035/00465; G01N
21/1702; G01N 21/718; G01N 21/86;
G01N 2201/066; G01N 33/02; G01N
33/4915; G01N 33/54346; G01N 1/2202;
G01N 21/8803; G01N 2201/1211; G01N
29/2418; G01N 33/0027; G01N
2015/045; G01N 2015/1413; G01N
2021/653; G01N 2021/8578; G01N
2021/8887; G01N 2033/4975; G01N
21/534; G01N 21/636; G01N 2201/022;
G01N 2201/06193; G01N 27/447; G01N
33/64; G01N 1/30; G01N 2021/7773;
G01N 21/3581; G01N 21/4785; G01N
21/9503; G01N 2201/0691; G01N
33/442; G01N 33/553; G01N 35/1095;
G01N 2011/008; G01N 2015/0687; G01N
2500/10; G01N 33/6893; G01N 35/085;
G01N 2001/2244; G01N 2015/1495;
G01N 2021/3181; G01N 2201/067; G01N
2201/129; G01N 33/1893; G01N
33/4972; G01N 1/34; G01N 1/44; G01N
15/1031; G01N 2021/3137; G01N
2021/6423; G01N 2021/6469; G01N
2021/656; G01N 21/251; G01N
2201/0683; G01N 33/025; G01N
33/5008; G01N 33/86; G01N 2015/0681;
G01N 2021/3129; G01N 2021/4769;
G01N 2021/945; G01N 21/4133; G01N
21/5907; G01N 21/78; G01N 2201/0638;
G01N 33/493; G01N 33/5438; G01N
33/68; G01N 33/6842; G01N 33/6845;
G01N 2021/054; G01N 2021/5957; G01N
2201/0631; G01N 2201/0675; G01N
33/80; G01N 2021/1738; G01N
2021/1772; G01N 2021/9583; G01N
2033/184; G01N 2035/1032; G01N
2201/063; G01N 2333/70596; G01N
33/5094; G01N 1/2813; G01N 15/04;
G01N 2021/4742; G01N 2021/651; G01N
2021/7776; G01N 2021/8592; G01N
2035/00306; G01N 2035/00455; G01N
2035/1034; G01N 21/278; G01N
2201/0642; G01N 27/745; G01N
2800/26; G01N 2800/52; G01N 33/1826;
G01N 33/48721; G01N 33/491; G01N
33/545; G01N 1/31; G01N 2021/575;
G01N 21/272; G01N 21/3103; G01N
21/6489; G01N 2201/0639; G01N
2201/12723; G01N 33/5026; G01N
33/587; G01N 35/00603; G01N 15/0625;
G01N 2021/0378; G01N 2021/158; G01N
2021/3133; G01N 2021/3148; G01N
2021/3155; G01N 2021/4714; G01N
2021/5969; G01N 2021/635; G01N
21/7746; G01N 2201/0616; G01N
2201/1428; G01N 30/78; G01N 33/32;
G01N 33/53; G01N 33/54353; G01N
33/558; G01N 33/57492; G01N
2015/0266; G01N 2021/7845; G01N
2021/8835; G01N 2021/9511; G01N
2030/027; G01N 2035/0401; G01N
21/07; G01N 21/643; G01N 21/87; G01N
2201/0218; G01N 2201/0245; G01N
2201/0637; G01N 2333/70589; G01N
33/4905; G01N 33/561; G01N 33/6851;
G01N 33/84; G01N 35/1097; G01N
2001/028; G01N 2001/386; G01N
2015/142; G01N 2021/0357; G01N
2021/0385; G01N 2021/4719; G01N
2021/4783; G01N 2021/7736; G01N
2035/00039; G01N 21/80; G01N 21/84;
G01N 2201/0693; G01N 2201/088; G01N
2201/10; G01N 2201/122; G01N
2203/0089; G01N 23/20; G01N
2333/924; G01N 33/48735; G01N
33/5002; G01N 33/502; G01N 33/573;
G01N 33/92; G01N 2001/2893; G01N
2021/8416; G01N 2021/9513; G01N
2035/00495; G01N 2035/0093; G01N
2035/0453; G01N 21/93; G01N
2201/0228; G01N 2201/0407; G01N
2201/103; G01N 2201/1293; G01N
23/205; G01N 33/24; G01N 33/5432;
G01N 1/2806; G01N 11/10; G01N
2015/0003; G01N 2015/0049; G01N
2021/1725; G01N 2021/1789; G01N
2021/217; G01N 2021/335; G01N
2021/473; G01N 2021/655; G01N
2021/7789; G01N 2030/025; G01N
2035/00168; G01N 2035/00326; G01N
2035/00386; G01N 2035/00475; G01N
2035/0429; G01N 2035/0436; G01N
2035/0448; G01N 2035/0465; G01N
2035/0475; G01N 2035/0484; G01N
21/1717; G01N 21/6447; G01N 21/71;
G01N 21/8903; G01N 2201/0216; G01N
2201/0624; G01N 2201/0806; G01N
23/2251; G01N 27/72; G01N 3/00; G01N
30/86; G01N 33/0047; G01N 33/5044;
G01N 33/537; G01N 33/538; G01N
33/56911; G01N 9/00; G01N 1/10; G01N
2001/2833; G01N 2021/035; G01N 2021/157; G01N 2021/1765; G01N
2021/391; G01N 2021/6497; G01N
21/09; G01N 21/61; G01N 21/9027;
G01N 21/95684; G01N 2291/0256; G01N
2291/106; G01N 35/00623; G01N
2015/003; G01N 2015/0277; G01N
2021/177; G01N 2021/558; G01N
2021/8861; G01N 2021/8874; G01N
2035/0437; G01N 21/763; G01N
2201/1085; G01N 23/04; G01N
2333/70585; G01N 2405/00; G01N
27/44704; G01N 33/2823; G01N
33/5058; G01N 33/5304; G01N 33/536;
G01N 33/54333; G01N 35/1074; G01N
2015/055; G01N 2015/1422; G01N
2021/1791; G01N 2021/3166; G01N
2021/4728; G01N 2021/4733; G01N
2021/6491; G01N 2021/7783; G01N
2021/8433; G01N 2021/8663; G01N
2035/1037; G01N 21/3554; G01N 21/43;
G01N 21/6404; G01N 21/894; G01N
21/9515; G01N 2201/0256; G01N
2201/0625; G01N 2201/0626; G01N
2333/4603; G01N 2500/04; G01N
2800/385; G01N 2800/387; G01N
29/2425; G01N 30/466; G01N 33/0006;
G01N 33/1886; G01N 33/552; G01N
33/557; G01N 33/56905; G01N
33/56961; G01N 35/109; G01N 1/02;
G01N 11/00; G01N 15/065; G01N
2015/1461; G01N 2021/0367; G01N
2021/0382; G01N 2021/1704; G01N
2021/174; G01N 2021/536; G01N
2021/757; G01N 2021/8438; G01N
2021/8854; G01N 21/66; G01N 21/90;
G01N 21/954; G01N 2201/0634; G01N
2201/0813; G01N 2203/0016; G01N
2203/0252; G01N 2203/0254; G01N
2203/0258; G01N 2203/0617; G01N
2203/0623; G01N 2203/0641; G01N
2291/02872; G01N 23/2258; G01N
2333/11; G01N 2333/904; G01N
27/4473; G01N 29/00; G01N 29/032;
G01N 3/10; G01N 3/18; G01N 30/06;
G01N 33/551; G01N 33/57423; G01N
33/6896; G01N 11/16; G01N 15/0618;
G01N 15/0643; G01N 2015/0846; G01N
2021/0307; G01N 2021/0389; G01N
2021/1742; G01N 2021/213; G01N
2021/0394; G01N 2021/4166; G01N
2021/435; G01N 2021/559; G01N
2021/6434; G01N 2021/8405; G01N
2021/8477; G01N 2021/869; G01N
2021/8917; G01N 2030/003; G01N
2030/0035; G01N 2033/0081; G01N
2035/00247; G01N 2035/00881; G01N
21/0317; G01N 21/19; G01N 21/3559;
G01N 21/455; G01N 21/774; G01N
21/89; G01N 2201/0214; G01N
2201/0231; G01N 2201/0655; G01N
2201/082; G01N 2201/084; G01N
2201/1045; G01N 2201/1087; G01N
2201/121; G01N 2201/127; G01N
2333/00; G01N 27/44708; G01N 3/04;
G01N 30/00; G01N 33/00; G01N
33/5436; G01N 33/57407; G01N
33/6878; G01N 35/00722; G01N 1/24;
G01N 13/02; G01N 2015/1062; G01N
2021/015; G01N 2021/1736; G01N
2021/1785; G01N 2021/1787; G01N
2021/3185; G01N 2021/3196; G01N
2021/396; G01N 2021/4702; G01N
2021/4797; G01N 2021/8908; G01N
2021/8965; G01N 2035/0418; G01N
2035/1018; G01N 2035/1062; G01N
21/431; G01N 21/631; G01N 2201/0662;
G01N 2201/0692; G01N 2201/0873;
G01N 2201/104; G01N 2201/1042; G01N
2333/195; G01N 2333/445; G01N
2333/70514; G01N 24/08; G01N
2400/50; G01N 2405/04; G01N 2405/08;
G01N 2570/00; G01N 27/44717; G01N
27/44743; G01N 27/44747; G01N
27/44756; G01N 29/449; G01N 30/724;
G01N 33/005; G01N 33/365; G01N
33/533; G01N 33/6839; G01N 33/6854;
G01N 33/721; G01N 35/00663; G01N
13/00; G01N 15/08; G01N 15/088; G01N
2013/006; G01N 2015/0057; G01N
2015/1068; G01N 2021/154; G01N
2021/1731; G01N 2021/1744; G01N
2021/1757; G01N 2021/175; G01N
2021/1795; G01N 2021/258; G01N
2021/317; G01N 2021/3188; G01N
2021/4721; G01N 2021/4764; G01N
2021/4771; G01N 2021/6415; G01N
2021/7796; G01N 2021/8411; G01N
2021/8564; G01N 2021/8867; G01N
2021/8925; G01N 2021/8967; G01N
2035/00277; G01N 2035/00643; G01N
2035/00801; G01N 2035/00891; G01N
2035/0413; G01N 2035/0415; G01N
2035/0425; G01N 2035/0494; G01N
2035/1013; G01N 2035/1053; G01N
21/892; G01N 21/898; G01N 2201/0238;
G01N 2201/06153; G01N 2201/126;
G01N 2201/12746; G01N 2201/128;
G01N 2291/02433; G01N 23/046; G01N
2333/4712; G01N 2333/70535; G01N
24/10; G01N 27/00; G01N 27/127; G01N
27/62; G01N 30/6095; G01N 33/188;
G01N 33/2858; G01N 33/343; G01N
33/362; G01N 33/4875; G01N 33/5029;
G01N 33/5067; G01N 33/544; G01N
33/56; G01N 33/583; G01N 33/94; G01N
35/00594; G01N 35/021; G01N 35/1072;
G01N 5/045; G01N 9/24; G01N 1/00;
G01N 1/04; G01N 1/08; G01N 1/2252;
G01N 1/286; G01N 1/312; G01N 1/4022;
G01N 1/4044; G01N 15/0806; G01N
15/1431; G01N 2001/2826; G01N
2001/284; G01N 2011/0046; G01N
2021/0106; G01N 2021/0314; G01N
2021/0321; G01N 2021/1782; G01N
2021/214; G01N 2021/218; G01N
2021/3122; G01N 2021/3172; G01N
2021/3568; G01N 2021/4173; G01N
2021/6465; G01N 2021/887; G01N
2021/9586; G01N 2035/0376; G01N
2035/00544; G01N 2035/00564; G01N 2035/00702; G01N 2035/009; G01N
2035/1054; G01N 21/256; G01N 21/67;
G01N 21/73; G01N 21/8914; G01N
2201/0446; G01N 2001/0628; G01N
2201/0668; G01N 2201/125; G01N
2203/0051; G01N 2223/419; G01N
2223/423; G01N 2291/048; G01N 23/06;
G01N 23/2254; G01N 2474/20; G01N
27/66; G01N 2800/50; G01N 29/0681;
G01N 30/8675; G01N 33/0037; G01N
33/182; G01N 33/225; G01N 33/28;
G01N 33/2847; G01N 33/4707; G01N
33/56927; G01N 33/588; G01N 35/02;
G01N 1/76; G01N 2021/6421; G01N
21/45; G01N 2001/2886; G01N 33/5308;
G01N 2035/00148; G01N 15/146; G01N
2021/3595; G01N 29/4818; G01N
2035/00751; G01N 1/32; G01N
27/44726; G01N 2015/0233; G01N
2458/00; G01N 2333/726; G01N 33/58;
G01N 2333/24533; G01N 33/5091; G01N
33/56916; G01N 33/56938; G01N 21/27;
G01N 2333/31; G01N 2333/32; G01N
2333/33; G01N 2015/035; G01N
2001/045; G01N 2035/00108; G01N
23/223; G01N 21/82; G01N 2291/0423;
G01N 2333/90241; G01N 29/022; G01N
33/581; G01N 2291/02466; G01N
23/083; G01N 2035/00811; G01N
27/403; G01N 33/74; G01N 2201/1248;
G01N 23/207; G01N 27/622; G01N
30/7266; G01N 25/147; G01N 2500/02;
G01N 29/2462; G01N 2223/0766; G01N
2223/643; G01N 2291/0255; G01N
33/2811; G01N 1/42; G01N 2021/1708;
G01N 2021/825; G01N 23/044; G01N
2333/4709; G01N 2333/4737; G01N
27/626; G01N 33/0016; G01N 33/00584;
G01N 35/1011; G01N 2021/1706; G01N
2021/1712; G01N 2030/847; G01N
2030/8494; G01N 2291/02425; G01N
23/10; G01N 25/00; G01N 29/222; G01N
29/343; G01N 33/0009; G01N 33/54388;
G01N 33/56988; G01N 1/2258; G01N
2001/4088; G01N 2021/0396; G01N
2030/3038; G01N 2035/00366; G01N
21/11; G01N 2201/1241; G01N
2201/1288; G01N 2291/0215; G01N
33/531; G01N 35/1009; G01N
2001/4027; G01N 2021/056; G01N
2021/3174; G01N 2030/765; G01N
2030/8813; G01N 2035/0427; G01N
2201/06186; G01N 23/20025; G01N
23/221; G01N 2510/00; G01N 30/6091;
G01N 30/95; G01N 33/5014; G01N
33/5767; G01N 35/1081; G01N
2021/695; G01N 2030/3061; G01N
2035/00504; G01N 2035/1051; G01N
2223/31; G01N 2223/612; G01N
2291/02475; G01N 2291/02809; G01N
27/44773; G01N 29/0672; G01N 30/722;
G01N 33/346; G01N 33/48707; G01N
35/1016; G01N 5/0278; G08B 17/107;
G08B 17/113; G08B 29/185; G08B
17/06; G08B 13/187; G08B 17/125;
G08B 13/186; G08B 29/18; G08B 7/06;
G08B 17/10; G08B 29/24; G08B 5/36;
G08B 21/12; G08B 17/103; G08B
29/145; G08B 21/10; G08B 25/01; G08B
25/10; G08B 29/043; G08B 13/124;
G08B 27/008; G08B 21/182; G08B
21/02; G08B 21/14; G08B 21/18; G08B
29/188; G02B 2006/12104; G02B
2027/0112; G02B 21/24; G02B 6/0011;
G02B 6/02238; G02B 6/0229; G02B
6/02304; G02B 6/02361; G02B 6/3826;
G02B 6/4201; G02B 21/0064; G02B
27/095; G02B 30/25; G02B 5/3058;
G02B 6/0015; G02B 6/0081; G02B
6/12007; G02B 6/29367; G02B 6/3652;
G02B 6/3855; G02B 1/111; G02B 19/00;
G02B 27/0938; G02B 27/126; G02B
6/0045; G02B 6/032; G02B 6/1226;
G02B 6/355; G02B 6/3636; G02B
6/3874; G02B 1/113; G02B 2006/0098;
G02B 21/33; G02B 27/00; G02B 27/12;
G02B 27/28; G02B 3/02; G02B 3/10;
G02B 6/0063; G02B 6/3624; G02B
6/4212; G02B 6/4266; G02B 7/00; G02B
13/0085; G02B 2006/12061; G02B
21/0084; G02B 2207/101; G02B 26/004;
G02B 26/08; G02B 27/0103; G02B
27/146; G02B 30/00; G02B 5/0252;
G02B 5/1838; G02B 5/286; G02B 6/009;
G02B 6/1228; G02B 6/3644; G02B
6/4232; G02B 7/022; G02B 13/0025;
G02B 13/006; G02B 17/0864; G02B
2006/12121; G02B 2027/0105; G02B
25/00; G02B 25/002; G02B 26/103;
G02B 27/0905; G02B 27/1026; G02B
27/1033; G02B 27/14; G02B 27/147;
G02B 27/4205; G02B 3/0018; G02B
30/34; G02B 30/60; G02B 6/0218; G02B
6/02295; G02B 6/02366; G02B 6/107;
G02B 6/1203; G02B 6/24; G02B 6/25;
G02B 6/3502; G02B 6/3869; G02B
6/4202; G02B 6/4267; G02B 7/005;
G02B 7/16; G02B 7/183; G02B
2006/12035; G02B 2006/12069; G02B
2006/12164; G02B 2006/12197; G02B
21/002; G02B 21/008; G02B 21/244;
G02B 21/245; G02B 2207/114; G02B
27/0043; G02B 27/0179; G02B 27/286;
G02B 27/288; G02B 27/40; G02B
27/4233; G02B 27/62; G02B 27/646;
G02B 3/0062; G02B 6/02138; G02B
6/125; G02B 6/131; G02B 6/3524; G02B
6/3572; G02B 6/367; G02B 6/3885;
G02B 7/023; G02B 2006/0325; G02B
21/0004; G02B 21/0048; G02B 21/125;
G02B 23/2423; G02B 23/243; G02B
26/04; G02B 26/06; G02B 27/0961;
G02B 27/4277; G02B 3/04; G02B
6/02061; G02B 6/0281; G02B 6/0288;
G02B 6/2856; G02B 6/4203; G02B
6/4231; G02B 6/4269; G02B 7/04; G02B
19/0009; G02B 2006/12195; G02B 21/28;
G02B 2207/107; G02B 2207/123; G02B
23/26; G02B 26/026; G02B 27/09; G02B
5/283; G02B 5/3066; G02B 6/266; G02B 6/2726; G02B 6/2821; G02B 6/2835; G02B 6/2937; G02B 6/3512; G02B 6/3578; G02B 6/3604; G02B 6/3668; G02B 6/368; G02B 6/3692; G02B 6/4219; G02B 6/4234; G02B 6/4291; G02B 7/021; G02B 7/08; G02B 7/102; G02B 19/0052; G02B 2006/1215; G02B 2027/0116; G02B 21/025; G02B 21/365; G02B 27/0988; G02B 3/0081; G02B 5/0825; G02B 5/136; G02B 5/1876; G02B 5/284; G02B 6/0033; G02B 6/02371; G02B 6/0239; G02B 6/03694; G02B 6/29395; G02B 6/36; G02B 3/3861; G02B 6/4226; G02B 6/424; G02B 1/00; G02B 1/08; G02B 17/00; G02B 17/086; G02B 2027/0187; G02B 21/08; G02B 21/12; G02B 21/30; G02B 23/2461; G02B 23/2476; G02B 26/005; G02B 26/007; G02B 27/0911; G02B 27/4227; G02B 27/58; G02B 5/001; G02B 5/005; G02B 5/0289; G02B 5/0841; G02B 5/12; G02B 5/13; G02B 5/1871; G02B 6/02052; G02B 6/02152; G02B 6/0365; G02B 6/245; G02B 6/2706; G02B 6/2804; G02B 6/3608; G02B 6/3825; G02B 6/3845; G02B 6/3895; G02B 6/4244; G02B 7/182; G02B 1/046; G02B 1/06; G02B 2006/12095; G02B 2006/12102; G02B 2006/12183; G02B 2006/1219; G02B 21/0012; G02B 21/367; G02B 26/001; G02B 26/085; G02B 27/0966; G02B 27/0972; G02B 27/106; G02B 27/281; G02B 27/46; G02B 5/188; G02B 5/24; G02B 6/0285; G02B 6/1345; G02B 6/322; G02B 6/3508; G02B 6/40; G02B 6/4208; G02B 6/4209; G02B 6/4238; G02B 6/4248; G02B 9/04; G02B 13/143; G02B 2006/02161; G02B 2027/0132; G02B 21/0036; G02B 21/04; G02B 21/18; G02B 23/08; G02B 23/105; G02B 27/0012; G02B 5/0816; G02B 5/085; G02B 5/0866; G02B 5/207; G02B 5/265; G02B 5/288; G02B 6/0048; G02B 6/02004; G02B 6/02185; G02B 6/02395; G02B 6/03611; G02B 6/03627; G02B 6/03638; G02B 6/03688; G02B 6/255; G02B 6/264; G02B 6/2746; G02B 6/2766; G02B 6/28; G02B 6/2808; G02B 6/2817; G02B 6/2843; G02B 6/293; G02B 6/3696; G02B 6/38; G02B 6/382; G02B 6/3834; G02B 6/3847; G02B 6/3873; G02B 6/421; G02B 6/4221; G02B 6/4224; G02B 6/425

See application file for complete search history.

(56) References Cited

U.S. PATENT DOCUMENTS

| | | | | |
|---|---|---|---|---|
| 9,915,600 | B2 * | 3/2018 | Walls | G01N 15/0205 |
| 2006/0232773 | A1 * | 10/2006 | Barton | G01N 21/53 |
| | | | | 356/338 |
| 2008/0297360 | A1 | 12/2008 | Knox et al. | |
| 2009/0009345 | A1 * | 1/2009 | Conforti | G08B 17/107 |
| | | | | 340/627 |
| 2009/0190221 | A1 * | 7/2009 | Boer | G02B 21/32 |
| | | | | 250/221 |
| 2011/0058167 | A1 * | 3/2011 | Knox | H04N 7/18 |
| | | | | 356/338 |
| 2012/0038903 | A1 | 2/2012 | Weimer et al. | |

FOREIGN PATENT DOCUMENTS

| | | | | |
|---|---|---|---|---|
| JP | 2002507145 | A * | 3/2002 | |
| WO | WO-9529393 | A1 * | 11/1995 | G01N 15/0205 |
| WO | WO-2004102498 | A1 * | 11/2004 | G01N 15/1434 |
| WO | WO-2010124347 | A1 * | 11/2010 | F21K 9/00 |
| WO | WO-2012166119 | A1 * | 12/2012 | B41J 2/04561 |

OTHER PUBLICATIONS

International Preliminary Report on Patentability for International Application No. PCT/US2019/031234 dated Nov. 26, 2020.

* cited by examiner

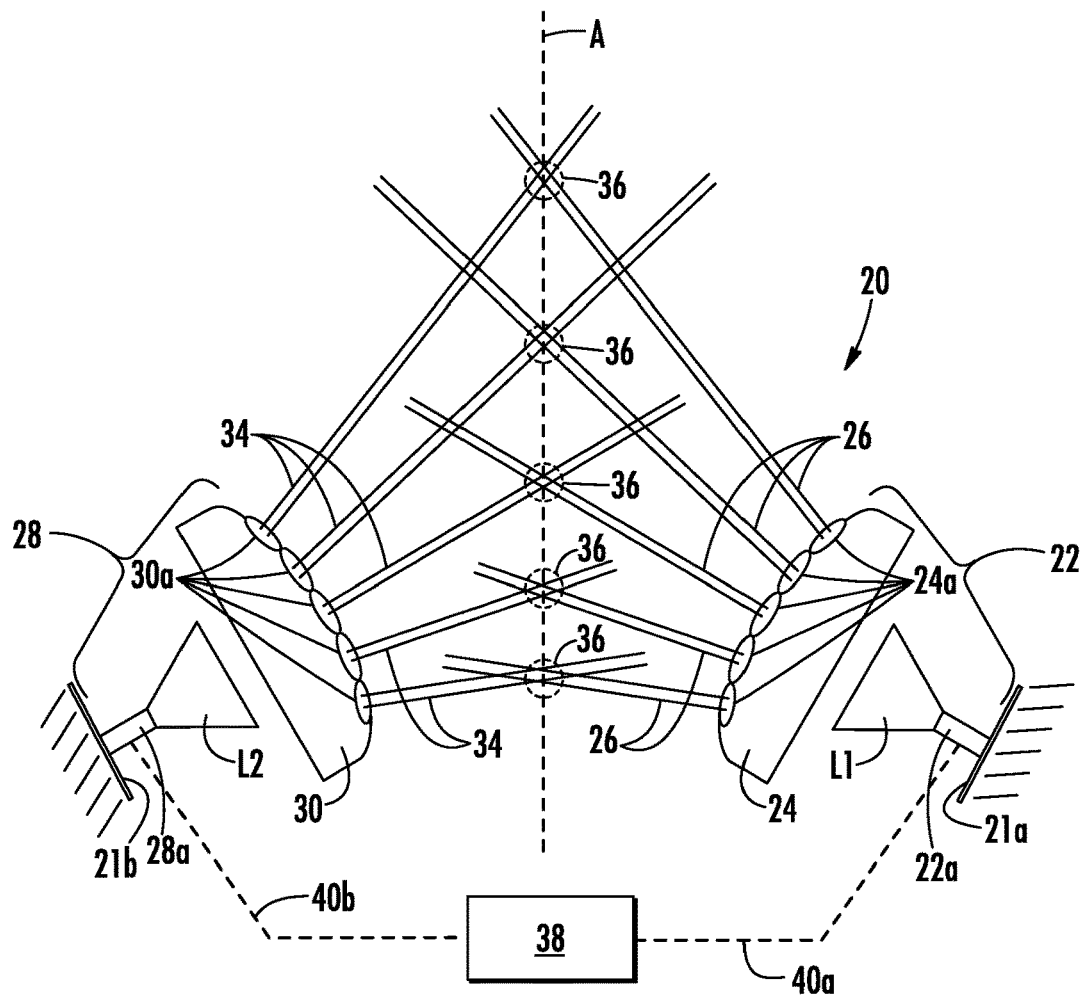
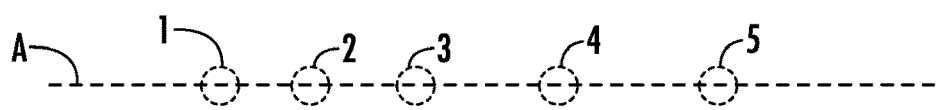
FIG. 2
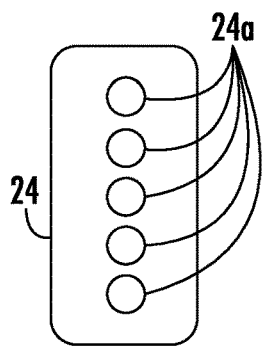
FIG. 3
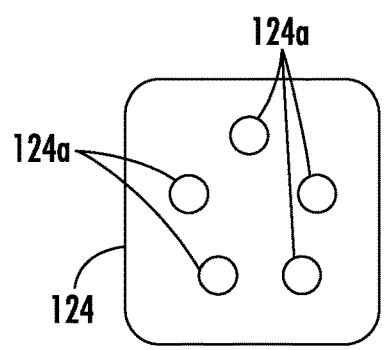
FIG. 4
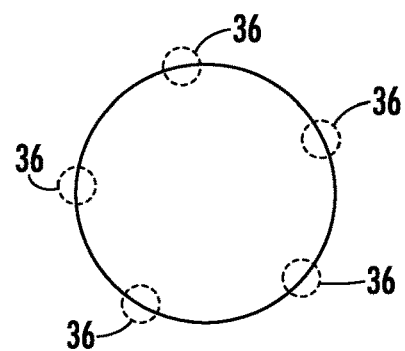
FIG. 5

MULTI-POINT DETECTION SYSTEM

CROSS-REFERENCE TO RELATED APPLICATIONS

This application claims benefit of U.S. Provisional Application No. 62/670,143 filed May 11, 2018.

BACKGROUND

There are several types of optical detectors for smoke detection and the like. One type is an aspirating detector that may include a chamber, a light emitter, and a light sensor. Ambient air is circulated through the chamber. The light emitter directs light through the chamber and the light sensor detects the intensity of the light received. The light sensor emits signals that are proportional to the intensity of the light received. When particles from smoke are present in the ambient air, the particles block or scatter a portion of the light. As a result, the intensity of the light received, and thus the signals, changes. This change is used to determine whether smoke is present and may trigger an alarm, for example.

Another type of optical detector is a chamber-less detector. In this approach, rather than the chamber, a light beam is emitted through an open volume, such as a room. A light sensor in the volume detects intensity of light and, similar to the aspirating detector, determines whether smoke is present based on changes in intensity.

SUMMARY

A multi-point detection system according to an example of the present disclosure includes one or more light sources configured to emit an array of collimated light beams, and one or more light sensors defining an array of lines of view. Each of the lines of view intersect different ones of the collimated light beams at respective detection nodes. The one or more light sensors are operable to emit sensor signals responsive to received process light from interaction of the collimated light beams with an analyte at the detection nodes. A controller is connected to receive the sensor signals. The controller is configured to determine from the process light whether the analyte contains a target species.

In a further embodiment of any of the foregoing embodiments, the one or more light sources includes one or more modulated light sources.

In a further embodiment of any of the foregoing embodiments, the detection nodes lie substantially in a single plane.

In a further embodiment of any of the foregoing embodiments, at least one of the one or more light sources and at least one of the one or more light sensors are configured with micro-lenses.

In a further embodiment of any of the foregoing embodiments, the one or more light sources is a single light source and a collimating lens array that divides light from the single light source into the collimated light beams.

In a further embodiment of any of the foregoing embodiments, the one or more sensors is a single light sensor and a collimating lens array that defines the array of lines of view and focuses scattered light received along the lines of view onto the single light sensor.

In a further embodiment of any of the foregoing embodiments, the one or more light sources includes a plurality of collimated light sources arranged to emit the array of collimated light beams.

In a further embodiment of any of the foregoing embodiments, the one or more sensors includes a plurality of collimated light sensors arranged to define the array of lines of view.

In a further embodiment of any of the foregoing embodiments, the controller is configured to determine a chemical identity of the target species from one or more of an amplitude of the process light, spectrum of the process light, and polarization of the process light over the range of wavelengths via the sensor signals.

A method for installing a multi-point detection system according to an example of the present disclosure includes mounting one or more light sources configured to emit an array of collimated light beams, and mounting one or more light sensors that define an array of lines of view such that the lines of view intersect different ones of the collimated light beams at respective detection nodes. The one or more light sensors are operable to emit sensor signals responsive to received process light from interaction of the collimated light beams with an analyte at the detection nodes, and connect the one or more light sensors with a controller to receive the sensor signals. The controller is configured to determine from the process light whether the analyte contains a target species.

In a further embodiment of any of the foregoing embodiments, the one or more light sources includes one or more modulated light sources.

In a further embodiment of any of the foregoing embodiments, the detection nodes lie substantially in a single plane.

A multi-point detection system according to an example of the present disclosure includes one or more modulated light sources configured to emit an array of collimated light beams, and one or more light sensors define an array of lines of view. The lines of view intersect different ones of the collimated light beams at respective detection nodes. The one or more light sensors are operable to emit sensor signals responsive to received process light from interaction of the collimated light beams with an analyte at the detection nodes. A controller is connected to receive the sensor signals. The controller is configured to determine from the process light whether the analyte contains a target species, and determine distances of the detection nodes based on time-of-flight of the collimated light beams from the one or more light sources to the detection nodes and process light from the detection nodes to the one or more light sensors.

In a further embodiment of any of the foregoing embodiments, the controller is configured to determine whether a cloud of the target species is moving and at what speed the cloud of the target species is moving.

In a further embodiment of any of the foregoing embodiments, the controller is configured to determine that the cloud of the target species is moving by identifying at which detection nodes the target species is present at a first time, identifying at which detection nodes the target species is present at a second, later time, and identifying a pattern in which the species is present at one or more of the detection nodes at the second time but not the first time and in which the species was present at one or more of the detection nodes at the first time but not the second time.

In a further embodiment of any of the foregoing embodiments, the controller is configured to estimate the speed at which the cloud of the target species is moving by identifying at which detection nodes the target species is present at a first time, identifying at which detection nodes the target species is present at a second, later time, identifying that the species is present at one of the detection nodes at the second time but not the first time, and estimating the speed based on a distance between the detection nodes and a time difference between the first time and the second time.

In a further embodiment of any of the foregoing embodiments, the controller is configured to determine whether a cloud of the target species is changing in cloud size and at what rate the cloud size is changing.

In a further embodiment of any of the foregoing embodiments, the controller is configured to determine that the cloud of the target species is changing in cloud size by identifying at which detection nodes the target species is present at a first time, identifying at which detection nodes the target species is present at a second, later time, and identifying a pattern in which the target species is present at one or more of the detection nodes at the second time but not the first time and in which the detection nodes for which the target species were present at the first time continue to be present at the second time.

In a further embodiment of any of the foregoing embodiments, the controller is configured to determine the rate that the cloud size is changing by identifying at which detection nodes the target species is present at a first time, identifying at which detection nodes the target species is present at a second, later time, identifying that the species is present at one of the detection nodes at the second time but not the first time, and estimating the rate based on a distance between the detection nodes and a time difference between the first time and the second time.

A method according to an example of the present disclosure includes emitting an array of collimated light beams from one or more light sources such that each of the collimated light beams intersect at respective detection nodes with an array of lines of view of one or more light sensors. The one or more light sensors are operable to emit sensor signals responsive to received process light from interaction of the collimated light beams with an analyte at the detection nodes, and determine whether a target species is present in the analyte based the sensor signals.

A further embodiment of any of the foregoing embodiments includes at least one of pulsing the collimated light beams, varying a pulse width of the collimated light beams, varying an inter-pulse interval of the collimated light beams, varying an amplitude of the collimated light beams, varying a frequency of the collimated light beams, or varying a polarization of the collimated light beams.

In a further embodiment of any of the foregoing embodiments, determining whether the target species is present in the analyte is based on an aggregate of the sensor signals from at least two of the detection nodes.

A further embodiment of any of the foregoing embodiments includes determining whether the target species is one or more of moving, spreading, and contracting based on the sensor signals.

A further embodiment of any of the foregoing embodiments includes changing operation of a heating, ventilation, and air conditioning system in response to determining that the target species is present.

A further embodiment of any of the foregoing embodiments includes determining whether there is a trend of increasing concentrations of the target species across two or more of the nodes and triggering an alarm if there is the trend.

A further embodiment of any of the foregoing embodiments includes determining a mean value and variance of a concentration of the target species across the nodes based on an aggregate distribution of the sensor signals and triggering an alarm if both the mean value and the variance increase.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 1 illustrates an example multi-point detection system.

FIG. 2 illustrates a linear configuration of detection nodes from the system of FIG. 1.

FIG. 3 illustrates an example of a light source from the multi-point detection system of FIG. 1.

FIG. 4 illustrates another example of a light source for a multi-point detection system.

FIG. 5 illustrates a circular configuration of detection nodes for a multi-point detection system.

DETAILED DESCRIPTION

Figure 9:
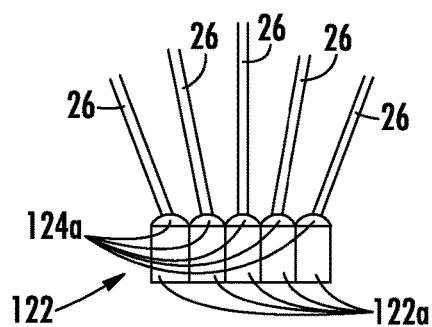
FIG. 9 illustrates an example light source with multiple discrete light sources and multiple discrete micro-lenses.

FIG. 1 schematically illustrates a multi-point detection system 20 ("system 20"). As will be appreciated from the examples herein, the system 20 can provide detection of a variety of chemicals and particles over a wide region, with enhanced characterization analytics.

The system 20 is disposed in a region in which an analyte (e.g., air) is to be monitored for one or more target species. Although not limited, the region may be a room and the analyte may be air circulating in the room. The system 20 may be used to determine the presence of target species in the analyte (and thus in the region), such as smoke, chemicals, and bio-agents, as well as identify the type of chemical(s) or agents in the analyte. Such information may then be used to identify threat situations and, if appropriate, trigger an alarm or other response.

The system 20 includes one or more light sources 22, which may be mounted/affixed using fasteners or the like onto a support 21a (e.g., a wall, a ceiling, a corridor, a room, a building structure, etc.). In this example, the light source 22 utilizes a single light source or element 22a that emits light, represented at L1, to a lens element 24 of the light source 22. The lens element 24 in this example includes a plurality of lenses 24a that divide and collimate the light L1 into an array of collimated light beams 26. Light sources 22 may emit light beams 26 in a single plane, in multiple planes, or in other three-dimensional pattern(s). Lenses 24a may be varied by controller 38, e.g., as a variable attenuation to modulate the light intensity (amplitude) using a half-wave plate and a polarizer, and the like. Independently, Lenses 24a may be varied by controller 38, e.g., as a variable polarization (as a liquid crystal polarization rotator). As used herein, an "array" is not restricted to a design having regular spacing in any dimension in some coordinate system, e.g., cartesian, polar, or the like. In specific, an array may have random position and orientation in 1D, 2D, or 3D.

The light source 22 may emit light over a range of wavelengths and/or frequencies. As an example, the light source 22a is a laser that can emit a laser beam at a wavelength that can be altered in a controlled manner across a range of wavelengths and range of pulse frequencies or other modulation in a controlled manner. For instance, light source 22 can scan the analyte across ranges of amplitudes, wavelengths (frequencies), polarizations, and/or pulse frequencies or timings. As used herein, "light" may refer to wavelengths in the visible spectrum, as well near infrared (NIR), midwave infrared (MWIR), longwave infrared (LWIR), near ultraviolet, and far ultraviolet, regions. In general, light source 22 may emit radiation at any frequency in the electromagnetic spectrum.

The system 20 also includes one or more light sensors 28, which may also be mounted/affixed using fasteners or the like onto a support 21b (e.g., a wall, a ceiling, a corridor, a room, a building structure, etc.). In this example, the light sensor 28 utilizes a single light sensor or element 28a that receives focused light, represented at L2, from a lens element 30 of the light sensor 28. The light sensor 28a may be a solid state sensor, such as but not limited to, a photosensor. Example photosensors may include photodiodes, bipolar phototransistors, photosensitive field-effect transistors, and the like.

The lens element 30 in this example includes a plurality of lenses 30a that define an array of lines of view 34. A "line of view" is a straight path from a lens 30a along which the lens 30a can, to the exclusion of light from other directions, receive light from the region in which the system 20 is used. The lines of view 34 may lie in a single plane, in multiple planes, or in other three-dimensional pattern(s).

Each of the lines of view 34 intersect different ones of the collimated light beams 26 at respective detection nodes 36, which in one non-limiting embodiment are half way between the light source 22 and the light sensor 28. Each detection node 36 is a localized region in space at which a line of view 34 crosses a collimated light beam 26. Since both the collimated light beam 26 and the line of view 34 have a two-dimensional cross-section, a detection node 36 may be substantially equal to the volume of the intersecting portions of the collimated light beam 26 and the line of view 34. In one non-limiting example, the nodes 36 may lie substantially in a single plane and thus may constitute a "light curtain". This light curtain may be oriented substantially vertically, as in an outdoor application, where ambient winds might propel contaminants across the curtain. The light curtain may be oriented substantially horizontally, as in an indoor application, where heat release might propel a buoyant plume of contaminants across the curtain. In general, the light curtain may be oriented in any direction. The distribution of nodes 36 within a light curtain may be such that they can provide coverage to a much larger space than the sum of their individual sizes. In one non-limiting embodiment this may be done for smoke detection, where nodes 36 in a light curtain are less than 1 square foot and spaced 30 feet apart. In another non-limiting embodiment, each detection node 36 in a light curtain may be spaced about 30 square feet to about 1000 square feet apart. In general, the nodes 36 may overlap, but alternatively some or all of the nodes may be spaced-apart to provide larger coverage.

In the illustrated example, both the array of collimated light beams 26 and the array of lines of view 34 are planar. The planar arrangements result in a linear configuration of the detection nodes 36 along axis A (FIG. 1), which is also shown in an orthogonal view in FIG. 2. For instance, to obtain the planar array, the lenses 24a of the lens element 24 have a linear configuration, as shown in the view of the lens element in FIG. 3. The lenses 30a of lens element 30 proximal to the light sensor 28 can also have a linear configuration.

The configuration of the detection nodes 36 can alternatively be non-linear. For instance, FIG. 4 illustrates a lens element 124 that may be used in place of the lens element 24 in the light source 22. The lens element 124 has lenses 124a arranged in a circular configuration. The lens element 30 and lenses 30a proximal to the light sensor 28 may also have a circular configuration. As a result of the circular arrays, the detection nodes 36 have a circular configuration as shown in FIG. 5. The circular configuration can be used to cover a different expanse in the region in which the system 20 is used. As will be appreciated, the arrays could be arranged in many other configurations to generate configurations of the detection nodes 36 that are tailored to a particular region in which the system 20 is to be used or to a target area in the region which is to be monitored.

The analyte may circulate through the region in which the system 20 is implemented, including through the detection nodes 36. If the analyte contains one or more target species, upon entering one of the detection nodes 36, the target species may interact with the collimated light beam 26, thereby causing a response, such as scattering of a portion of the light and/or absorption and emission of light (collectively "process light"). Some of the process light travels in the direction along the line of view 34 for that detection node 36 and is thus received into the corresponding lens 30a, which focuses the process light (focused light L2) to the light sensor 28a.

The light source 22 and light sensor 28 are electrically or optically connected at respective connections 40a, 40b for communication with a controller 38, to control operation and receive feedback. It is to be understood that electrical and optical connections or communications herein can refer to direct connections, relayed connections, wire connections, wireless connections, or combinations of connections. The light sensor 28a is responsive to the received process light and is operable to emit sensor signals to the controller.

The controller 38 may include hardware (e.g., one or more microprocessors and memory), software, or both, that are configured (e.g., programmed) to carry out the functionalities described herein. In this example, the controller 38 is configured to determine from the process light whether the analyte contains a contaminant. For instance, the controller 38 determines whether a target species is present in the analyte based on an intensity of scattered light and the controller 38 may also determine a chemical identity of a species from a spectrum of the scattered light over the range of wavelengths. These two determinations may be referred to herein as, respectively, a presence determination and an identity determination.

The controller 38 can make a presence determination by analyzing the intensity of the sensor signals. In some instances, the sensor signals may be smaller than the ambient noise level in the sensed environment. In this case, controller 38 may correlate or convolve the sensor signals with a predetermined pattern where the predetermined pattern may be the light source modulation, or may be based on the light source modulation, to produce modified sensor signals which may then be used in presence determination and/or identity determination as the original sensor signals were. For instance, when no target species is present, the sensor signals are low. This may be considered to be a baseline or background signal, which can be distinguished from process light readings by the controller 38 pulsing the light source 22. The pulses allow the controller 38 to determine a background or baseline based on light intensity detected by sensor 28a in between pulses, and remove that background from the sensor signals taken by sensor 28a during the pulsing. When a species is present and scatters or emits light, the sensor signals increase in comparison to the baseline signal. Higher concentrations of species produce more scattering or emission and a proportional increase in the sensor signal. An increase that exceeds a threshold may serve as an indication by the controller 38 that a species is present. The threshold may be predetermined, e.g., by experiments at the time the system 20 is commissioned, may be determined from light sensors 28 during operation, and may be adapted or vary with the signals from light sensors 28 over time.

The controller 38 can also make an identity determination by controlling the wavelengths emitted by the light source 22a and analyzing the sensor signals over the range of wavelengths of the collimated light beams 26. For instance, the controller 38 scans the analyte over the range of wavelengths to collect temporal spectra of intensity versus wavelength (or equivalent unit). Different species respond differently with regard to absorbance and scattering of different wavelengths of light. Thus, the spectra of different types of species (taking into account a baseline or background spectra) differ and can be used as a signature to identify the type of species by comparison of the spectrum with a spectra library or database, which may be in the memory of the controller 38. In this manner, the controller 38 can identify chemicals of interest, while also discriminating those chemicals from interference substances that are not of interest, such as dust, mold, pollen, or other incidental substances that may be in the analyte. Example chemicals that can be identified may include, but are not limited to, carbonyls, silanes, cyanates, carbon monoxide, and hydrocarbons, which may be present in toxic gases, aerosols, particulates, or mixtures of these.

Unlike a system that uses a single light beam, the system 20 enables monitoring across multiple points (i.e., the detection nodes 36) of the region in which the system is implemented. This, in turn, provides additional analytic capabilities and monitoring over a larger expanse in the region than for a single light beam, which can only monitor a single point.

One analytic capability of the system 20 is the ability to determine distances of the detection nodes 36 based on time-of-flight of the collimated light beams 26 and process light received into the light sensor 28. For example, the light source 22 may be pulsed at a set frequency controlled by the controller 38. The controller 38 is programmed with the distances from the light source 22 to the respective detection nodes 36 and the distances from the detection nodes 36 to the light sensor 28. For a given pulse, the time-of-flight for each of the collimated beams 26 to reach the corresponding detection nodes 36 can be calculated using the constant speed of light (approximately 0.3 m/s) and the time-of-flight of process light from each of the detection nodes to the light sensor 28 can be calculated. Based on the timing of the pulse from the light source 22 and the time that the process light is received by the light sensor 28, the controller 38 can identify which detection node 36 has detected a species. In one non-limiting embodiment, the light source 22, its support 21a, light sensor 28, and its support 21b are designed such that the respective times of flight to nodes 36 are unique and thus allow unambiguous identification of which detection node 36 has detected a species. Such a design may be achieved by solving an optimization problem where the variables are the design positions and angles and the objective function is the pathlength difference for all nodes 46 from source to sensor and the goal is to maximize the minimum difference.

In another non-limiting embodiment, if the five detection nodes 36 of the example in FIG. 1 are located at the distances as shown in Table 1 below, the total time-of-flight ("TOF") for a pulse of the collimated light beam 26 to reach each detection node 36, scatter (if a contaminant is present at the node), and then reach the light sensor 28 can be calculated as total TOF (also shown in Table 1). Thus, if the controller 38 receives sensor signals that are indicative of presence of a species, the controller 38 can determine from the timing which detection node or nodes 36 have the species. For instance, in the example shown in Table 1 if the sensor signals are received 40 ns after a given pulse, the controller 38 determines that there is a species at detection node 1. Likewise, signals at 60 ns, 80 ns, 120 ns, and 160 ns are indicative of respective nodes 2, 3, 4, or 5, respectively, having the species. Table 1 or similar tables may be saved in the memory of the controller 38 as a data set such as, for example, lookup tables.

TABLE 1

Distance and time-of-flight to detection nodes.

| Node | Distance to light source (meters) | Distance to light sensor (meters) | Total TOF (nanoseconds) |
|---|---|---|---|
| 1 | 6 | 6 | 40 |
| 2 | 9 | 9 | 60 |
| 3 | 12 | 12 | 80 |
| 4 | 18 | 18 | 120 |
| 5 | 24 | 24 | 160 |

Figure 6:
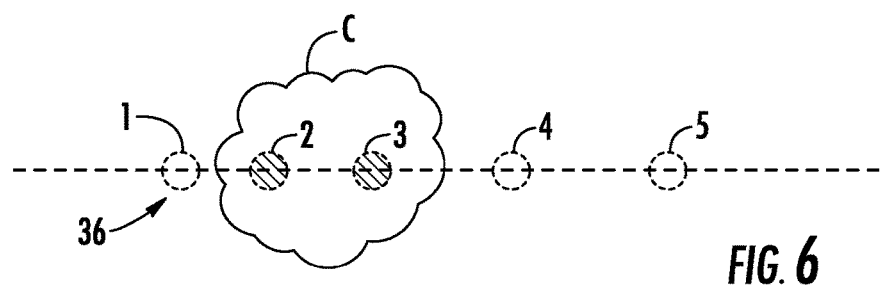
FIGS. 6 and 7 demonstrate an identification and movement of a contaminant cloud over two time frames in a multi-point detection system.
Figure 7:
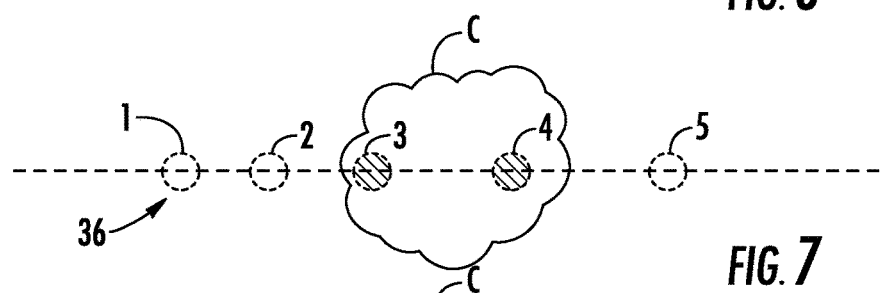

The controller 38 can further be configured to determine whether the species is moving and at what speed the species is moving. For instance, referring to FIG. 6 which shows a representation of the detection nodes 36, numbered 1-5 as from Table 1, at Time A contaminant cloud C envelops nodes 2 and 3, but not nodes 1, 4, or 5. The controller 38 identifies that at Time A there is contaminant species at nodes 2 and 3. At Time B, represented in FIG. 7, the controller 38 identifies that there is contaminant species at nodes 3 and 4. Contaminant species is no longer identified at node 2, and nodes 1 and 5 continue to have no contaminant species. The controller 38 compares the results at Time A and Time B, and identifies that contaminant species is no longer at node 2, that contaminant species continues to be at node 3, and that contaminant species is newly at node 4. From this pattern, the controller 38 concludes that there is a cloud of contaminant species that is moving.

The controller 38 can also be configured to estimate at what the speed the cloud is moving. For instance, the controller 38 can determine the time difference between Time A and Time B. The controller 38 is also programmed with the distances between the nodes 1-5. Here, based on the time difference and the distances between nodes 3 and 4, the controller 38 calculates the speed of the cloud. As an example, if the time difference is 1.25 seconds and the distance from node 3 to 4 is 5 meters, the speed is 4 meters per second (approximately 9 miles per hour).

Figure 8:
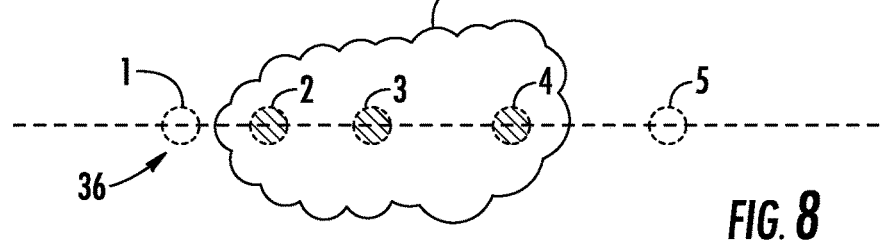
FIG. 8 demonstrates an identification of a change in size and rate determination of a contaminant cloud in a multi-point detection system.

The controller 38 can also be configured to determine whether the cloud is changing in size. For instance, at Time A a contaminant species cloud C envelops nodes 2 and 3 as in FIG. 6. At Time C, represented in FIG. 8, the controller 38 identifies that there is contaminant species at nodes 2, 3, and 4. The controller 38 compares the results at Time A and Time C, and identifies that contaminant species is newly at node 4 and that contaminant species continues to be at nodes 2 and 3. From this pattern, the controller 38 concludes that there is a cloud of contaminant species that is expanding. Similarly, if the contaminant species is at fewer nodes at Time C than at Time A, the controller 38 concludes that the cloud is contracting.

The controller 38 can also be configured to determine the rate at which the size of the cloud is changing. Similar to the speed, based on the time difference and the distances between nodes, the controller 38 calculates the rate of change. As an example, if the time difference between Time A and Time C is 3.7 seconds and the distance from node 3 to 4 is 5 meters, the rate of expansion is 1.35 meters per second (approximately 3 miles per hour).

FIG. 9 illustrates an alternate light source 122 that may be used in the system 20. In this example, rather than the single light source 22*a* and lens element 24 there are multiple discrete light sources 122*a* and multiple discrete micro-lenses 124*a*. Each micro-lens 124*a* is mounted on one of the light sources 122*a*. The micro-lenses 124*a* collimate the light from the light sources 122*a* into the array of collimated light beams 26. Light sources 122*a* with associated micro-lenses 124*a* may be arranged in a linear or non-linear spacing in one, two, or three dimensions.

Figure 10:
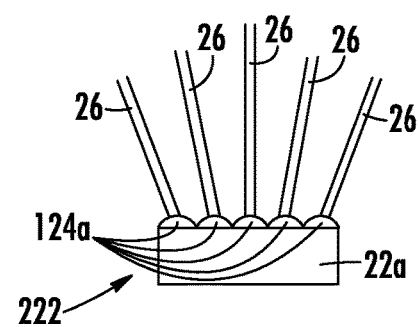
FIG. 10 illustrates an example light source with a single light source and multiple discrete micro-lenses.

In another alternative light source 222 illustrated in FIG. 10, the single light source 22*a* is used, but with the micro-lenses 124*a* directly on the single light source 22*a*. Here, micro-lenses 124*a* may be arranged in a linear or non-linear spacing on light source 22*a*. The surface of light source 22*a* may have a one, two, or three-dimensional topography.

Figure 11:
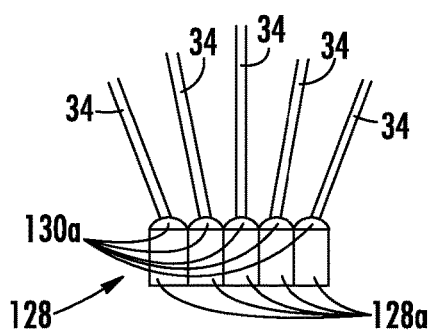
FIG. 11 illustrates an example light sensor with multiple discrete light sensors and multiple discrete micro-lenses.

FIG. 11 illustrates an alternate light sensor 128 that may be used in the system 20. In this example, rather than the single light sensor 28*a* and lens element 30 there are multiple discrete light sensors 128*a* and multiple discrete micro-lenses 130*a*. Each micro-lens 130*a* is mounted on one of the light sensors 128*a*. The micro-lenses 130*a* define the array of lines of view 34. Light sensors 128*a* with associated micro-lenses 130*a* may be arranged in a linear or non-linear spacing in one, two, or three dimensions.

In another example, the system 20 could be adapted to identify presence of a biological agent from the detection nodes 36. In this case, one of the discrete light sources 122*a* of the alternate light source 122 described above emits light with a selected wavelength or wavelength range that coincides with an adsorption wavelength of a target species. The wavelength range of emitted light can be 250 nm-1500 nm or in a more limiting example 250 nm-550 nm. When the target species enters the corresponding node 36 it absorbs the light and re-emits the light at a different, characteristic wavelength. A portion of the re-emitted light may be emitted along the line of sight 34 toward the corresponding light sensor 128*a*. The light sensor 128*a* may include a filter to block the wavelength of the light source 122*a* and other wavelengths outside of the characteristic wavelength. The light sensor 128*a* may thus receive only the light having the characteristic wavelength. This enables the light sensor 128*a* to detect the presence and concentration of the particular target species from the intensity of the sensor signal of that light sensor 128*a*. In some embodiments this information may then be used in coordination with detection at other nodes 36 to verify whether a detected presence of an unknown species at one or more other nodes 36 is the particular target species.

Figure 12:
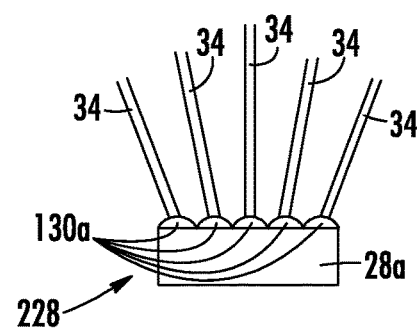
FIG. 12 illustrates an example light sensor with a single light sensor and multiple discrete micro-lenses.

In another alternative light sensor 228 illustrated in FIG. 12, the single light sensor 28*a* is used, but with the micro-lenses 130*a* directly on the single light sensor 28*a*. Here, micro-lenses 130*a* may be arranged in a linear or non-linear spacing on light sensor 28*a*. The surface of light sensor 28*a* may have a one, two, or three-dimensional topography.

As will be appreciated, any of light sensors 28, 128, or 228 can be used in combination with any of light sources 22, 122, or 222, and may be arranged linearly or non-linearly as described above with respect to FIGS. 1-5. In addition, it is to be understood that one or more light sources 22, 122, or 222 may be used with one or more light sensors 28, 128, 228. For instance, one or more collimated light beams 26 of light sources 22, 122, 222 may intersect lines of view 34 of two or more of the light sensors 28, 128, 228, to increase the density of nodes 36. In another example, collimated light beams 26 of different spectral colors may be used for selective detection. For instance, a collimated light beam 26 of one color may be effective for detecting species 1 but not species 2, and a collimated light beam 26 of a different color may be effective for detecting species 2 but not species 1. This establishes nodes 36 that are selective as to what kind of species they are screening for.

The following examples demonstrate control strategies of the system 20. Unlike a single node or groups of nodes that more or less serve individually, the nodes 36 provide a group control strategy that may enhance early detection and threat event responsiveness.

In one example, the detectors 32 serve as a group, i.e., a detection network, to identify and track detected species. For instance, if one of the nodes 36 identifies a target species (e.g., smoke), in response the controller 38 may determine whether any other of the nodes 36 also have identified the target species. If no other node 36 identifies the target species, there is a low confidence level of the presence of the target species. As a result, the controller 38 may take no action or, depending on system alarm settings, may trigger a low level alarm. However, if one or more additional nodes 36 also identifies the target species, there is a higher confidence level that the target species is present. In response, the controller 38 may trigger an alarm and/or take responsive action. An example action is to command one or more changes in an HVAC system in the region in which the system 20 is used. For instance, dampers may be moved from open to closed states and/or fans and compressors may be deactivated, to reduce the ability of the target species to spread.

In a further example, the nodes 36 are used as a group to provide a two-prong detection strategy—one based on high concentration limits and another based on trending detection in the nodes 36. In the first approach (high concentration), there is an alarm level for concentration of the target species at any one of the nodes 36. If the level is exceeded at any one of the nodes 36, the controller 38 triggers an alarm. For instance, the intensities of the sensor signals are representative of the concentration of the target species at the nodes 36. The controller 38 statistically aggregates the sensor signals and produces a distribution across all of the nodes 36. An alarm level for high concentration may be set with regard to a mean value of the distribution (e.g., the mean plus a multiple of the statistical standard deviation for the distribution). Thus, if the concentration of the target species at any one of the nodes 36 were to exceed the alarm limit, the controller 38 would trigger an alarm.

In the second approach (trending detection), the controller 38 looks for increases in concentration of the target species across two or more of the nodes 36. In this approach a threat event is identified based on trending, but prior to the concentration reaching the high levels that would trigger the alarm under the high concentration approach as described elsewhere herein. For instance, controller 38 may identify an increase in concentration at one of the nodes 36 and, within a preset time period of that, identify an increase in concentration at one or more other nodes 36. Thus, across a time period, the controller 38 identifies progressive increases in the number of the nodes 36 that have increasing concentrations. The time period may be varied, but in one example may be a relatively short time on the order of about one second to about 600 seconds, which is designed to address relatively rapidly unfolding/spreading threat events.

Upon identifying this progressive increase in the number of the nodes 36 that have increasing concentrations (but are below the high concentration alarm limit described elsewhere herein), the controller 38 may take no response, trigger a low level alarm, or trigger a high level alarm. In one example, the decision tree for this response is based on the number of nodes 36 that have increasing concentrations. For instance, if only a single node 36 has increasing concentration, the controller 38 takes no action. If two to four detectors have increasing concentrations, the controller 38 triggers a low level alarm. And if more than four nodes 36 have increasing concentrations, the controller 38 triggers a high level alarm. As will be appreciated, the numbers of nodes 36 that trigger these various responses can be varied, for example, depending upon the nature of the species detected, or other variables. In other words, the controller 38 can be configured or programmed to select a response that depends on the number of nodes 36 that have increasing concentrations that are under the alarm limit of the first approach from above.

There is an additional statistical approach that may be used with, or in place of, the high concentration or trending approaches described elsewhere herein. This statistical approach is somewhat similar to the trending approach in that it is also based on trending prior to the concentration reaching the high levels that would trigger the high concentration alarm. In this statistical approach the controller 38 looks for one or more particular trends over time in the mean value of the distribution taken from the statistical aggregate of the sensor signals of the nodes 36. Most typically, the time period here would be longer than the time period above for the trending approach, as the approach here is intended to discriminate slow-moving events. For instance, the controller 38 identifies whether the mean and the variance of the distribution changes over time (e.g., over a period of more than 600 seconds up to several days or weeks) and, based on the outcomes, discriminates between different types of events.

The following scenarios demonstrate two examples of the statistical approach, the first of which is an event that is not a threat and the second of which is for a threat event. An increase in pollen in the air is an event that is not a threat, yet pollen may be detected and set off alarms in other systems that are not capable of identifying this type of event to avoid triggering an alarm (which would be a false indication of a threat). An increase in pollen levels may cause a slow increase in particulate concentration among the nodes 36, which over the time period increases the mean value of the distribution. However, since pollen is pervasive in the air at all the nodes 36, the variance of the distribution remains constant or changes very little over time. In this case, the controller 28 takes no responsive action.

Figure 13:
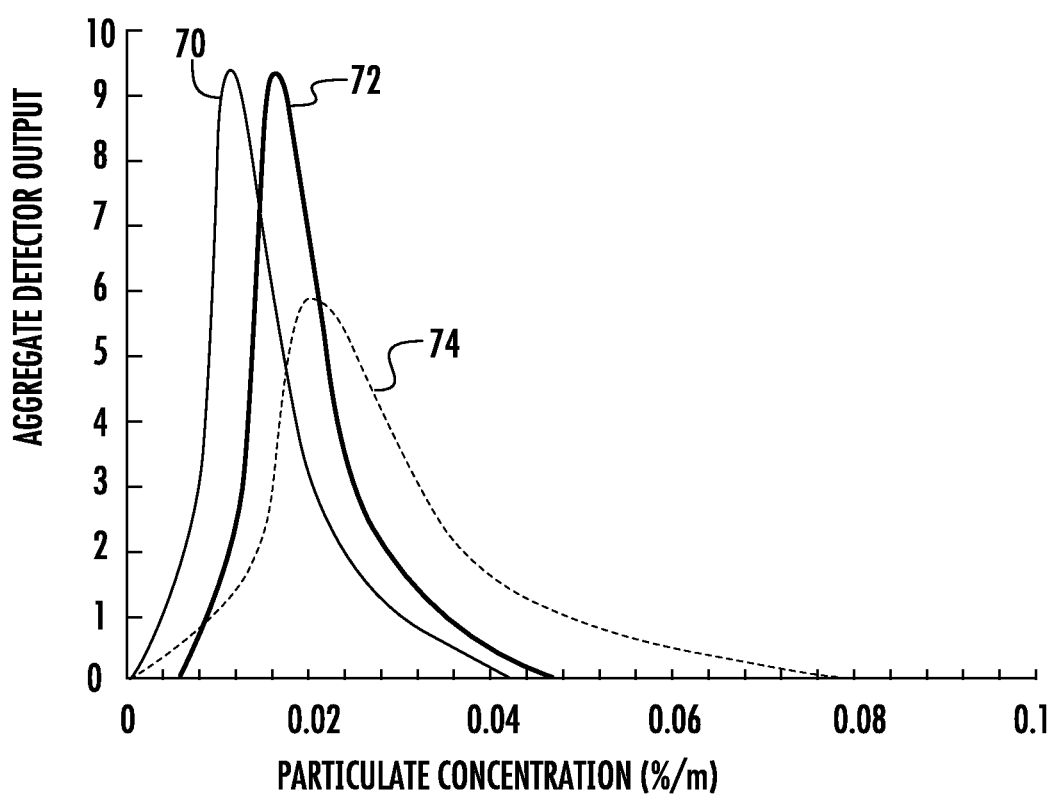
FIG. 13 illustrates an example graph having distributions of aggregate sensor signals, to demonstrate an example control strategy.

FIG. 13 graphically depicts such an event and the affect to increase the mean value of the distribution. FIG. 13 shows distributions 70 and 72 of aggregate sensor output versus particulate concentration. The distribution 70 represents a no-threat condition, i.e., a background condition. The distribution 72 represents the aggregate at a later time and is shifted to the right compared to distribution 70. The shift to the right indicates an increase in the mean value (at the peaks). The breadth of the distributions is representative of the variance. Here the variance of the distributions 70 and 72 is substantially identical, as both distributions 70 and 72 are relatively narrow, approximately bell-shaped curves.

The second scenario to demonstrate an example of the statistical approach relates to a slow-moving threat event. A slow-smoldering burning event or a bio-agent release may also cause a slow increase in particulate concentration among the nodes 36. However, this type of event has a different effect on the distribution. Like the pollen, the particulate from the burning or the bio-agent increases the mean value of the distribution over the time period. But since the particulate emanates from the site of the smoldering or the bio-agent emanates from the point of release, the concentration among the nodes 36 is likely to differ. Nodes 36 that are closer to the site or release point are likely to have higher concentrations. As a result, not only does the mean value of the distribution increase, but the variance of the distribution 74 increases. In this case, the controller 38 triggers an alarm in response to identifying an increase in the mean value and an increase in the variance. In this manner, the controller 38 discriminates between harmless events, such as increases in pollen levels which increase the mean but do not change the variance of the distribution, and potential threat events, such as the smoldering burning or bio-agent dispersal which increase the mean and also increase the variance of the distribution.

FIG. 13 depicts an increase in the mean and the variance. FIG. 13 shows a distribution 74 of aggregate sensor output versus particulate concentration that is representative of a smoldering burning or bio-agent release event. The distribution 74 represents the aggregate at a later time than the distribution 70 (the background condition) and is shifted to the right compared to distribution 70. The shift to the right indicates an increase in the mean value (at the peaks). The variance of the distributions 70 and 74 is substantially different, as distribution 70 is a narrow, approximately bell-shaped curve and the distribution 74 is a wide, approximately bell-shaped curve.

Also disclosed is a method for installing the system 20. The method includes mounting the one or more light sources 22, 122, 222, mounting the one or more light sensors 28, 128, 228, and connecting the light sources 22, 122, 222 and the one or more light sensors 28, 128, 228 via connections 40*a*, 40*b* with the controller 38. The light sources 22, 122, 222 and light sensors 28, 128, 228 may be mounted to the respective supports 21*a*, 21*b*. As an example, the light sources 22, 122, 222 and light sensors 28, 128, 228 may be mounted by fastening or securing the light sources 22, 122, 222 and light sensors 28, 128, 228 to the supports 21*a*, 21*b*. The installation may be part of an original installation in a building or other structure or part of a repair in which the system 20 is fully or partially replaced with new or repaired components. The installation may also include properly aligning the light sources 22, 122, 222 and the one or more light sensors 28, 128, 228 so that the collimated light beams 26 and the lines of view 34 intersect to generate the nodes 36. As an example, the array of light sources 22, 122, 222 and the array of the one or more light sensors 28, 128, 228 may be arranged at a fixed angle relative to one another. For instance, the arrays may be orthogonally arranged, but other angles could alternatively be used. An orthogonal arrangement may be used when a spacing between the light sources 22, 122, 222 and the one or more light sensors 28, 128, 228 is three meters or more. In another example, the light sources 22, 122, 222 and the one or more light sensors 28, 128, 228 are closer than three meters, but are not orthogonal.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A multi-point detection system comprising:
   one or more light sources configured to emit an array of collimated light beams;
   one or more light sensors defining an array of lines of view, each of the lines of view intersecting different ones of the collimated light beams at respective detection nodes, wherein each of the detection nodes is a localized region in space at which one of the lines of view crosses one of the collimated light beams, the one or more light sensors operable to emit sensor signals responsive to received process light from interaction of the collimated light beams with an analyte at the detection nodes; and
   a controller connected to receive the sensor signals, the controller configured to determine from the process light whether the analyte contains a target species and change operation of a heating, ventilation, and air conditioning system in response to determining that the target species is present.

2. The system as recited in claim 1, wherein the one or more light sources includes one or more modulated light sources, and the detection nodes lie substantially in a single plane.

3. The system as recited in claim 1, wherein at least one of the one or more light sources and at least one of the one or more light sensors are configured with micro-lenses.

4. The system as recited in claim 1, wherein the one or more light sources is a single light source and a collimating lens array that divides light from the single light source into the collimated light beams.

5. The system as recited in claim 1, wherein the one or more sensors is a single light sensor and a collimating lens array that defines the array of lines of view and focuses scattered light received along the lines of view onto the single light sensor.

6. The system as recited in claim 1, wherein the one or more light sources includes a plurality of collimated light sources arranged to emit the array of collimated light beams.

7. The system as recited in claim 1, wherein the one or more sensors includes a plurality of collimated light sensors arranged to define the array of lines of view.

8. The system as recited in claim 1, wherein the controller is configured to determine a chemical identity of the target species from one or more of an amplitude of the process light, spectrum of the process light, and polarization of the process light over the range of wavelengths via the sensor signals.

9. A method for installing a multi-point detection system, the method comprising:
   mounting one or more light sources configured to emit an array of collimated light beams;
   mounting one or more light sensors that define an array of lines of view such that the lines of view intersect different ones of the collimated light beams at respective detection nodes, the one or more light sensors operable to emit sensor signals responsive to received process light from interaction of the collimated light beams with an analyte at the detection nodes; and
   connecting the one or more light sensors with a controller to receive the sensor signals, the controller configured to determine from the process light whether the analyte contains a target species, determine whether the target species is one or more of moving, spreading, and contracting based on the sensor signals, and change operation of a heating, ventilation, and air conditioning system in response to determining that the target species is present.

10. The method as recited in claim 9, wherein the one or more light sources includes one or more modulated light sources.

11. The method as recited in claim 9, wherein the detection nodes lie substantially in a single plane.

12. A multi-point detection system comprising:
    one or more modulated light sources configured to emit an array of collimated light beams;
    one or more light sensors defining an array of lines of view, the lines of view intersecting different ones of the collimated light beams at respective detection nodes, the one or more light sensors operable to emit sensor signals responsive to received process light from interaction of the collimated light beams with an analyte at the detection nodes; and
    a controller connected to receive the sensor signals, the controller configured to:
      determine from the process light whether the analyte contains a target species,
      determine distances of the detection nodes based on time-of-flight of the collimated light beams from the one or more light sources to the detection nodes and process light from the detection nodes to the one or more light sensors, and
      determine whether a cloud of the target species is moving and at what speed the cloud of the target species is moving.

13. The system as recited in claim 12, wherein the controller is configured to determine that the cloud of the target species is moving by identifying at which detection nodes the target species is present at a first time, identifying at which detection nodes the target species is present at a second, later time, and identifying a pattern in which the species is present at one or more of the detection nodes at the second time but not the first time and in which the species was present at one or more of the detection nodes at the first time but not the second time.

14. The system as recited in claim 12, wherein the controller is configured to estimate the speed at which the cloud of the target species is moving by identifying at which detection nodes the target species is present at a first time, identifying at which detection nodes the target species is present at a second, later time, identifying that the species is present at one of the detection nodes at the second time but not the first time, and estimating the speed based on a distance between the detection nodes and a time difference between the first time and the second time.

15. The system as recited in claim 12, wherein the controller is configured to determine whether a cloud of the target species is changing in cloud size and at what rate the cloud size is changing.

16. The system as recited in claim 15, wherein the controller is configured to determine that the cloud of the target species is changing in cloud size by identifying at which detection nodes the target species is present at a first time, identifying at which detection nodes the target species is present at a second, later time, and identifying a pattern in which the target species is present at one or more of the detection nodes at the second time but not the first time and in which the detection nodes for which the target species were present at the first time continue to be present at the second time.

17. The system as recited in claim 15, wherein the controller is configured to determine the rate that the cloud size is changing by identifying at which detection nodes the target species is present at a first time, identifying at which detection nodes the target species is present at a second, later time, identifying that the species is present at one of the detection nodes at the second time but not the first time, and estimating the rate based on a distance between the detection nodes and a time difference between the first time and the second time.

18. A method comprising:
    emitting an array of collimated light beams from one or more light sources such that each of the collimated light beams intersect at respective detection nodes with an array of lines of view of one or more light sensors, the one or more light sensors operable to emit sensor signals responsive to received process light from interaction of the collimated light beams with an analyte at the detection nodes;
    determining whether a target species is present in the analyte based the sensor signals; and
    changing operation of a heating, ventilation, and air conditioning system in response to determining that the target species is present.

19. The method as recited in claim 18, further comprising at least one of pulsing the collimated light beams, varying a pulse width of the collimated light beams, varying an inter-pulse interval of the collimated light beams, varying an amplitude of the collimated light beams, varying a frequency of the collimated light beams, or varying a polarization of the collimated light beams.

20. The method as recited in claim 18, wherein the determining whether the target species is present in the analyte is based on an aggregate of the sensor signals from at least two of the detection nodes.

21. The method as recited in claim 18, further comprising determining whether the target species is one or more of moving, spreading, and contracting based on the sensor signals.

22. The method as recited in claim 18, further comprising determining whether there is a trend of increasing concentrations of the target species across two or more of the nodes and triggering an alarm if there is the trend.

23. The method as recited in claim 18, further comprising determining a mean value and variance of a concentration of the target species across the nodes based on an aggregate distribution of the sensor signals and triggering an alarm if both the mean value and the variance increase.

24. The system as recited in claim 1, wherein the controller is configured to determine whether the target species is one or more of moving, spreading, and contracting based on the sensor signals.

25. The system as recited in claim 1, wherein each of the detection nodes is substantially equal to a volume of intersecting portions of the collimated light beams and the lines of view.

* * * * *